Aug. 28, 1923.

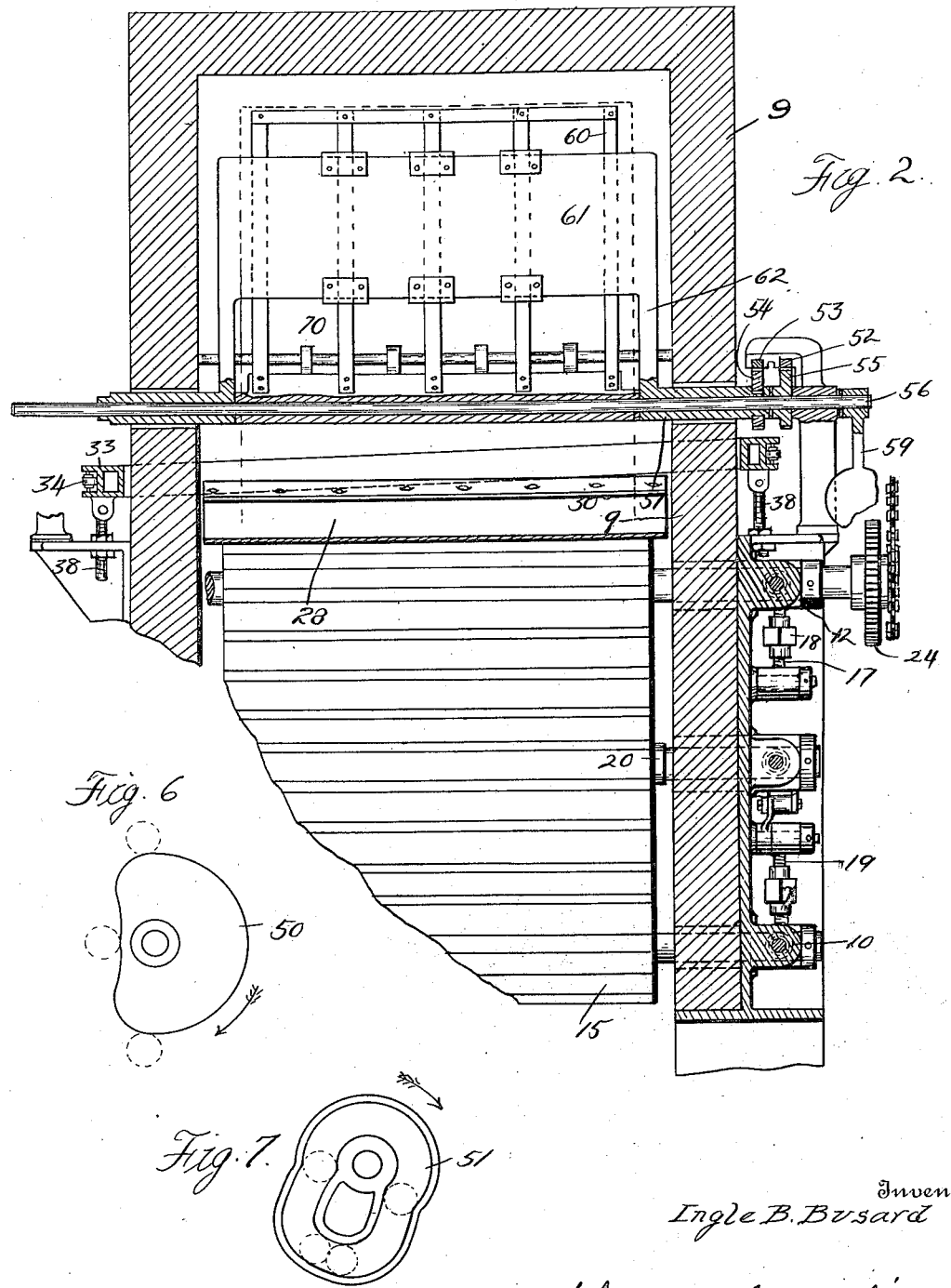

I. B. BUSARD 1,466,421

SHEET GLASS DRAWING AND DELIVERING MECHANISM

Filed Jan. 9, 1919    3 Sheets-Sheet 1

Inventor
Ingle B. Busard

Attorneys

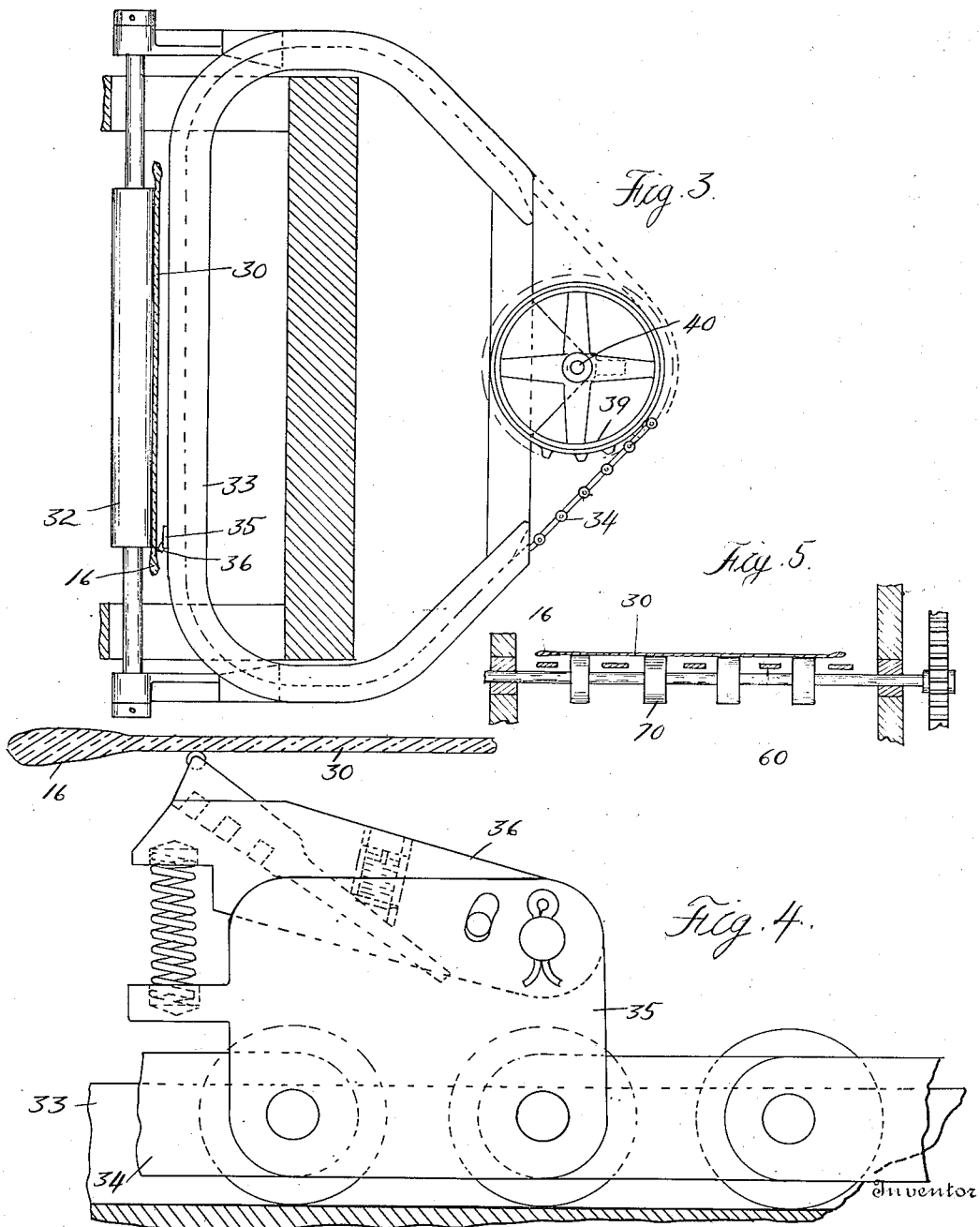

Patented Aug. 28, 1923.

1,466,421

UNITED STATES PATENT OFFICE.

INGLE B. BUSARD, OF CHARLESTON, WEST VIRGINIA, ASSIGNOR TO THE LIBBEY-OWENS SHEET GLASS COMPANY, OF CHARLESTON, WEST VIRGINIA, A CORPORATION.

SHEET-GLASS DRAWING AND DELIVERING MECHANISM.

Application filed January 9, 1919. Serial No. 270,323.

*To all whom it may concern:*

Be it known that I, INGLE B. BUSARD, a citizen of the United States of America, residing at Charleston. in the county of Kanawha and State of West Virginia, have invented certain new and useful Improvements in Sheet-Glass Drawing and Delivering Mechanism, of which the following is a specification, reference being had therein to the accompanying drawings.

The invention consists in the construction of a glass drawing and delivering mechanism in which a continuous sheet of glass is drawn in a vertical path, the end section severed and delivered horizontally to a horizontal carrier which may deliver it into the leer, and further in the construction, arrangement and combination of the various parts, as more fully hereinafter described and pointed out in the claims.

In the drawings:

Fig. 2 is a vertical transverse section, substantially on the line 2—2 of Fig. 1, some parts being broken away.

Fig. 3 is a plan of the scoring frame, chain and its drive-wheel;

Fig. 4 is an enlarged plan of the cutter;

Fig. 5 is a vertical section through the horizontal roller carrier for the detached sheet, showing the frame in depositing position; and Figs. 6 and 7 are elevations of the cams for operating the glass-handling frame and pusher.

Figure 1:
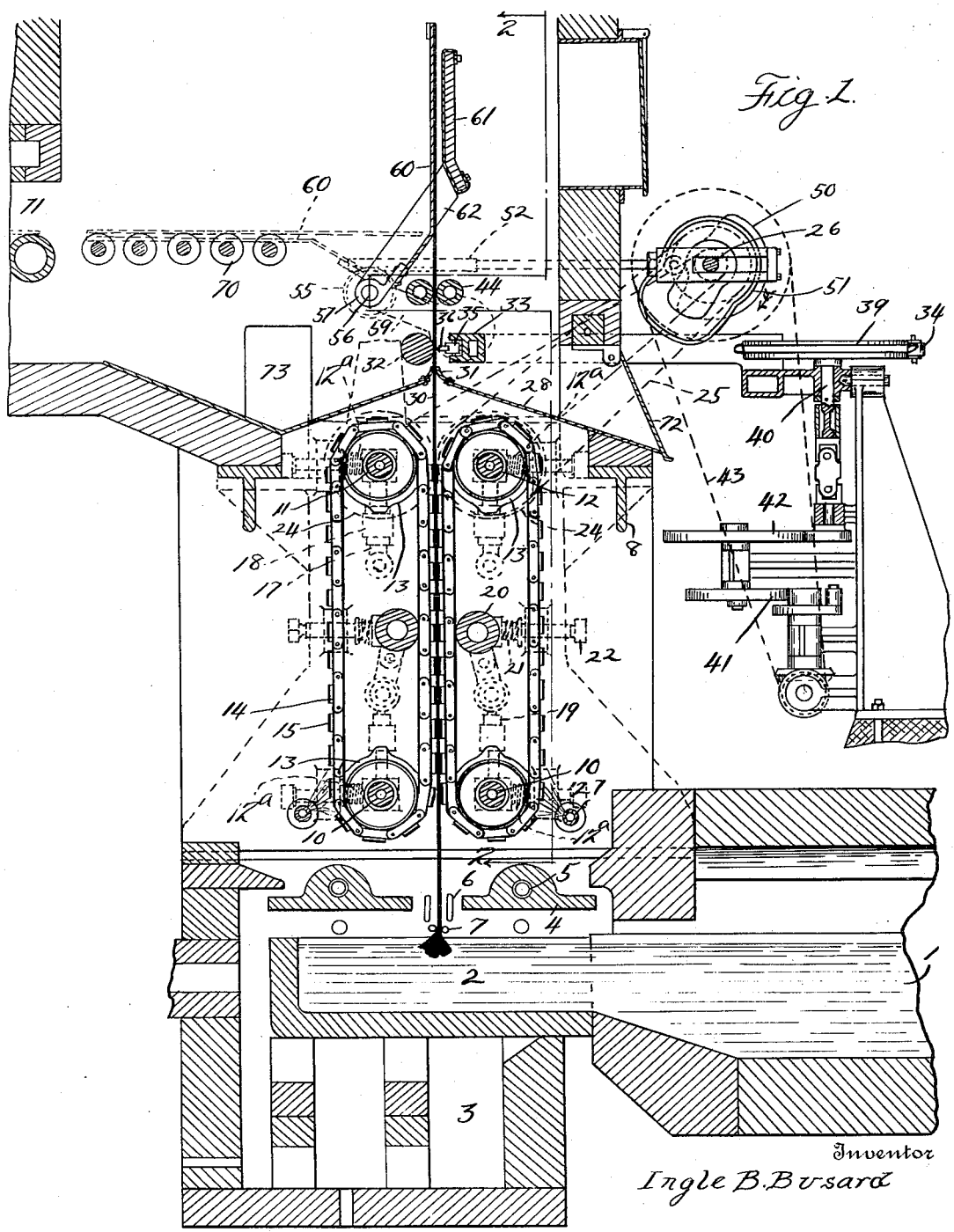
Fig. 1 is a vertical central section through a glass furnace, drawing mechanism and sheet-handling device, embodying my invention, parts being in section for clearness and parts shown in dotted lines.

In the drawings, 1 represents a glass tank of the continuous type, from which glass flows into a shallower tank, 2, which may be called the drawing tank. Below this is shown a suitable heating chamber, 3, and above it, on each side of the drawing point, are the top tiles, 4, supported on water-cooled supports, 5. At each side of the drawing point are adjustable water coolers, 6, and near the glass surface are pairs of width maintaining rollers, 7, these parts being of the general construction set forth in Colburn Patent No. 1,248,809, dated December 4, 1917.

Extending upward on each side of the drawing point, is a supporting frame, 8, which may be of any desired construction, and end frames, 9, which are preferably bricked up, as shown.

Supported in the frame-work is a suitable sheet drawing mechanism; that as shown comprises two bottom shafts, 10, 10, and upper shafts, 11, 12, having thereon suitable sprocket wheels, 13, over which pass the sprocket chains, 14, which chains, of each pair, are preferably connected by grip bars, 15, which are adapted to grip the thickened edges, 16, of the glass sheet between them, leaving the main body of the sheet free from contact therewith.

The bearings for the shafts, 11, 12, are supported on the links, 17, pivoted to the side frame, and adjustable as to length by the turn-buckles 18; thus providing for tightening the chains. The bearings for the shafts 10 are supported by similar adjustable links, 19, and these bearings as well as those for the shafts 11, 12, are backed by springs 12ª as shown in Fig. 1. This construction may be as shown for the bearing rolls, 20, which bear against the middle portion of the chain, and the bearings therefor in the end frames are backed by springs, 21, the tension of which is adjustable by screws 22 (Fig. 1).

The shafts 11, 12, are geared together by gear wheels, 24, and the shaft 12 is driven by a drive chain, 25, from the main drive shaft, 26. These drawing chains 14 are preferably kept heated, as by burners 27, so as not to unduly cool the glass.

At the top, there are two inclined roof plates, 28, which approach near each other, leaving a slot for the sheet of glass, 30, to pass through as it is drawn. This may be closed against broken glass by strips of asbestos, 31. Above the roof plates is a backing roller, 32, against which the cutter may act; 33 being the cutter frame, as shown in Figs. 2 and 3 supported on the main frame and having a suitable guide-way for the endless chain, 34, one link 35 of which is provided with a spring-pressed scoring device or cutter, 36, Fig. 4, which will score the glass as it travels across.

The frame 33 is inclined, as shown in Fig. 2 and supported at opposite edges of the glass by the adjusting screws, 38, to adjust the angle according to the speed of draw.

The chain 34 passes around the sprocket wheel 39 on the shaft 40, and is driven intermittently by a Geneva movement shown at 41, Fig. 1, and a gear connection, 42, the Geneva movement being driven from shaft 26 by the chain 43.

By this mechanism the sheet will be scored as it is drawn, at stated intervals, with a substantially transverse score. Beyond the scoring device the sheet passes between the rolls, 44, which are preferably idlers, and one or both of which should be spring-backed to permit the bait or any deformed glass to pass through without too great resistance.

When the sheet passes up beyond these rolls a distance equal to the distance between scores, it is intended that it be broken from the incoming sheet, and such severed end portion be carried away and delivered horizontally upon a horizontal carrier which will take it to the leer or leer carrier, because it is desirable that the sheet be handled and annealed in a flat horizontal position.

The mechanism now to be described is adapted to sever the end portion along the scored line, lift it free from the end of the oncoming sheet, turn it to the horizontal, deposit it upon a horizontal carrier, and return for another sheet or end section:—

On the main drive shaft 26 are two cams, 50 and 51, operating the rack bars, 52, 53, (Fig. 2) respectively. The rack-bars mesh with the gear pinions, 54, 55, which are respectively on the shafts, 56, 57; the shaft 57 being hollow and arranged around the shaft 56. Attached to the shaft 56 is a counterweighted lever, 59, and a frame, 60; and attached to the hollow shaft 57 is the pusher, or clamping-plate, 61, it being connected to the shaft by end arms, 62. It will be noticed that the shafts 56, 57, are arranged beside the drawing plane of the sheet.

The action of these parts with the cams properly shaped is as follows: As soon as the scoring device has moved across the sheet, and the scored line has reached a point just above the rollers, 44, the pusher 61 is moved to the left, Fig. 1, (by the cam and connected parts) until it clamps the sheet against the frame 60. The pusher and frame then move together, rocking about the axis of the shaft 56. Their first rocking movement is slow, so as to crack the glass along the scored line, and after this slight slow movement they move more rapidly, carrying the sheet clamped on the frame 60 until they reach nearly a horizontal position, when the pusher returns rapidly so as to reach its position before the oncoming sheet reaches its line of travel. The frame 60, with the sheet on it, continues its downward movement, and as it approaches the horizontal carrier, 70, composed of driven rollers, it slows down. The bars of the frame 60 can pass into the spaces between the roller sections of the carrier as shown in Fig. 5, so that the sheet will be deposited upon the rollers, which immediately move the sheet horizontally into the leer, 71, and out of the plane of the frame 60, which frame is now returned by its cam and rack-bar to be ready for another operation.

It will be understood that the sheet is initiated by a bait (not shown) in the usual manner, and the spring-pressed rollers of the endless drawing clamp permit this to be passed through. After the bait is broken off, the sheet will continue to be drawn, scored, and the end section detached and delivered to the horizontal.

It will be noticed that the shaft 56 is offset from the drawing line far enough so that the first movement of the sheet after being cracked off will be upward, to separate the end of the severed section from the oncoming sheet, as it is moved laterally out of the plane thereof. This prevents scraping of the cut edges and consequent broken sheets. By having a wide frame and a clamping device, as shown, broken sheets can be transferred to the horizontal carrier, if the sheet is not broken in too small pieces. Broken sections which fall on the inclined top sections 28 can be cleaned out through suitable doors, 72, 73.

What I claim as new is:

1. In an apparatus for drawing sheet glass, means for drawing a sheet of glass vertically, a horizontal leer conveyor, means for scoring the continuously advancing sheet at spaced intervals, a clamping plate movable against one face of the sheet to break off the section at the score, a supporting frame against which the severed sheet section is clamped by the clamping plate, means for successively moving the clamping plate against the sheet, swinging the plate, sheet section and frame into a horizontal plane, and quickly returning the clamping plate to its vertical position, the carrier frame remaining in horizontal position until it has delivered the sheet section to the leer conveyor, then returning to receive the next sheet section.

2. A device for carrying away successive severed end portions of a vertically moving drawn glass sheet, comprising two rocking frames, one a supporting frame and the other a clamping frame, and means for causing the clamping frame to return earlier than the supporting frame.

3. A device for cracking off and carrying away successive end portions of a scored, vertically moving, drawn glass sheet, comprising two rocking frames, one a supporting frame and the other a clamping frame, means for rocking the frames synchronously to first have a slow movement to crack the sheet, thereafter to increase their speed, finally to slow up for depositing the sheet, and then to return.

4. A device for carrying away successive severed end portions of a vertically moving drawn glass sheet, comprising a swinging clamp composed of a supporting frame and a clamping frame, means for rocking them together to clamp the glass sheet and move it from the vertical to the horizontal, and means for returning the clamping member in advance of the supporting member.

5. A device for carrying away successive severed end portions of a vertically moving drawn sheet of glass, comprising a swinging clamp adapted to clamp the severed section and move it from the vertical to a horizontal position, a horizontal carrier beside the frame, the clamp adapted to move below the plane of the carrier to lay the glass sheet thereon, and means for actuating the carrier to move the sheet out of the path of the clamp.

6. In a device for carrying away successive severed end portions of a vertically moving drawn sheet of glass, comprising a swinging clamp adapted to move the severed section from the vertical to the horizontal, a horizontal roller carrier beside the frame, the carrier having spaces into which the frame of the clamp may pass to deliver the sheet upon the rollers, and means for actuating the rollers to move the sheet off the clamp.

7. A drawing device for sheet glass, comprising a pair of parallelly arranged endless chains having their vertical runs arranged in proximity, clamping blocks on the chains adapted to clamp against the opposite sides of the sheet of glass, spring-pressed shafts carrying sprocket wheels over which the chains run, and intermediate spring-pressed rollers bearing against the intermediate portions of the inner runs of the chains.

8. In combination, means for drawing sheet glass and means for severing the glass as it is being drawn comprising an endless carrier, a scoring device carried thereby, and means for guiding said endless carrier and scoring device obliquely across the face of the moving sheet.

9. In combination, means for drawing sheet glass and means for severing the glass as it is being drawn comprising an endless carrier, a scoring device carried thereby, means for intermittently driving said carrier, and means for guiding said endless carrier and scoring device obliquely upward across the face of the moving sheet.

10. In combination, means for drawing sheet glass and means for scoring the sheet at right-angles to its length as it is being drawn comprising an endless carrier, a scoring device carried thereby, means for intermittently driving said carrier, and means for guiding said endless carrier obliquely across the face of the moving sheet, the inclination of said guiding means being adjustable to conform to the speed at which the sheet is drawn.

In testimony whereof I affix my signature.

INGLE B. BUSARD.